United States Patent
Han et al.

(10) Patent No.: US 7,093,290 B2
(45) Date of Patent: Aug. 15, 2006

(54) SECURITY SYSTEM FOR NETWORKS AND THE METHOD THEREOF

(75) Inventors: Min-Ho Han, Taejon (KR); Jung-Chan Na, Taejon (KR); Sung Won Sohn, Taejon (KR)

(73) Assignee: Electronics and Telecommunications Research Institute, Taejon (KR)

(*) Notice: Subject to any disclaimer, the term of this patent is extended or adjusted under 35 U.S.C. 154(b) by 931 days.

(21) Appl. No.: 09/987,933

(22) Filed: Nov. 16, 2001

(65) Prior Publication Data

US 2003/0167404 A1     Sep. 4, 2003

(30) Foreign Application Priority Data

Sep. 5, 2001    (KR) .............................. 2001-54398

(51) Int. Cl.
*H04L 9/00*    (2006.01)
*G06F 9/00*    (2006.01)
*G06F 11/00*   (2006.01)

(52) U.S. Cl. ........................ 726/22; 726/13; 726/23; 726/25; 713/151; 713/188; 709/224; 709/225

(58) Field of Classification Search .............. 713/201; 709/230, 224, 203
See application file for complete search history.

(56) References Cited

U.S. PATENT DOCUMENTS 6,363,489 B1* 3/2002 Comay et al. .............. 713/201

2002/0035698 A1* 3/2002 Malan et al. ................ 713/201
2002/0038339 A1* 3/2002 Xu .............................. 709/203
2002/0188864 A1* 12/2002 Jackson ...................... 713/201

FOREIGN PATENT DOCUMENTS

KR    2000-12194    3/2000
KR    2000-72707    12/2000

OTHER PUBLICATIONS

Schnackenberg, et al; *Infrastructure for Intrusion Detection and Response*; This paper appeared in the Proceedings of the DARPA Information Survivability Conference and Exposition (DISCEX) 2000, held in Hilton Head, S.C. on Jan. 25-27, 2000. Copyright 1999 by the Institute of Electrical and Electronics Engineers, Inc.

* cited by examiner

*Primary Examiner*—Kambiz Zand
*Assistant Examiner*—A. Nobahar
(74) *Attorney, Agent, or Firm*—Mayer, Brown, Rowe and Maw LLP

(57) ABSTRACT

Disclosed are a system and method of sharing intrusion detection information detected at different networks and tracking the intrusion, to thereby defense against the intrusion on a network to which an intruder belongs, and a computer-readable medium storing a program for implementing the above method therein. The system detects an intrusion through the analysis of an input packet, adds information associated with the intrusion into the packet, creates an active packet and transmits the active packet to an address of an intruder, which transmitted the packet. Thereafter, the system tracks the intrusion, for all routes through which the intruder passed based on the active packet, and filters the packet associated with the intruder for the isolation thereof.

7 Claims, 9 Drawing Sheets

SECURITY SYSTEM FOR NETWORKS AND THE METHOD THEREOF

FIELD OF THE INVENTION

The present invention relates to a security system and method for preventing an intrusion on networks, and a computer-readable medium storing a program for implementing the above method therein.

DESCRIPTION OF THE PRIOR ART

In recent, various information protection systems incorporate therein various security equipments for coping with security problems. Proposed is an integrated security solution combines various components, which take the responsibility of a network and server security such as an intrusion blocking and intrusion detection, to thereby provide a cooperation and interconnection against intrusion symptoms. Unfortunately, since all of such security systems detect an intrusion from the viewpoint of a local network and separately defenses against the detected intrusion, it is difficult to defense against an attacker or an intruder from the viewpoint of the overall network. Accordingly, there is a need to establish a system, which shares intrusion detection information detected at different network systems, and introduces a fixed defense scheme at all system environments based on the information.

A number of studies are under way on new approaches, which cope with the aforementioned systematical limitations. As representative examples, there are an IDIP (Intrusion Detection and Isolation Protocol) and a DecIDUouS (Decentralized Source Identification of Intrusion Source). Unfortunately, these approaches require modifications to existing network structures. Accordingly, what is need is a method, which has the ability to minimize modifications to the existing network structures, detect, track and isolate an intrusion.

SUMMARY OF THE INVENTION

It is, therefore, a primary object of the present invention to provide a system and method, which is capable of sharing intrusion detection information detected at different networks and tracking the intrusion, to thereby defense against the intrusion on a network to which an intruder belongs, and a computer-readable medium storing a program for implementing the above method therein.

In accordance with one aspect of the present invention, there is provided a security system on a network, including: intrusion detecting unit for detecting an intrusion through an analysis of a packet, adding intrusion information associated with the intrusion into the packet, creating an active packet and transmitting the active packet to an address of an intruder which transmitted the packet; and routing unit for tracking the intrusion, for all routes through which the intruder passed, based on the active packet transmitted thereto from the intrusion detecting means, and filtering the packet associated with the intruder, thereby isolating the intruder, wherein the routing unit includes active nodes on a local networks of a user to be attacked and the intruder.

In accordance with another aspect of the present invention, there is provided a method for use in a security system, the method including the steps of: a) detecting an intrusion through an analysis of a packet, adding intrusion information associated with the intrusion into the packet, creating an active packet and transmitting the active packet to an address of an intruder which transmitted the packet; and b) tracking the intrusion, for all routes through which the intruder passed, by sharing intrusion detection information detected at local network border routers each of which includes an active node, to thereby defense against the intrusion on a network to which the intruder belongs.

In accordance with still another aspect of the present invention, there is provided a computer-readable medium storing instructions for executing a method for use in a security system including a processor, the method including the steps of: a) detecting an intrusion through an analysis of a packet, adding intrusion information associated with the intrusion into the packet, creating an active packet and transmitting the active packet to an address of an intruder which transmitted the packet; and b) tracking the intrusion, for all routes through which the intruder passed, by sharing intrusion detection information detected at local network border routers each of which includes an active node, to thereby defense against the intrusion on a network to which the intruder belongs.

BRIEF DESCRIPTION OF THE DRAWINGS

The above and other objects and features of the present invention will become apparent from the following description of the preferred embodiments given in conjunction with the accompanying drawings, in which.

DETAILED DESCRIPTION OF THE PREFERRED EMBODIMENTS

The present invention uses an active network scheme in addition to the conventional packet filtering scheme, thereby minimizing modifications of the conventional network structure, which in turn, detects, tracks and isolates an intrusion. A detailed description will be made as to the packet filtering and the active network schemes.

The packet filtering scheme allows an intruder to be tracked by an intrusion defense and IP spoofing prevention, which allows or rejects the transmission of a packet based on a destination address of the packet and a service port number. In general, a router includes a packet filtering table, which is used in determining the transmission of the packet according to a type of the packet, which passes through the router. The router checks header information of all packets to be received or transmitted, compares the checked information with information in the packet filtering table, and allows or rejects transmitting the packet based on the compared result.

The active network scheme, unlike the conventional network, stores a program that a user wants into the packet, or executes a program that is previously provided by a particular administrator at a middle node (an active node), thereby making it possible to perform various active processes.

Figure 1:
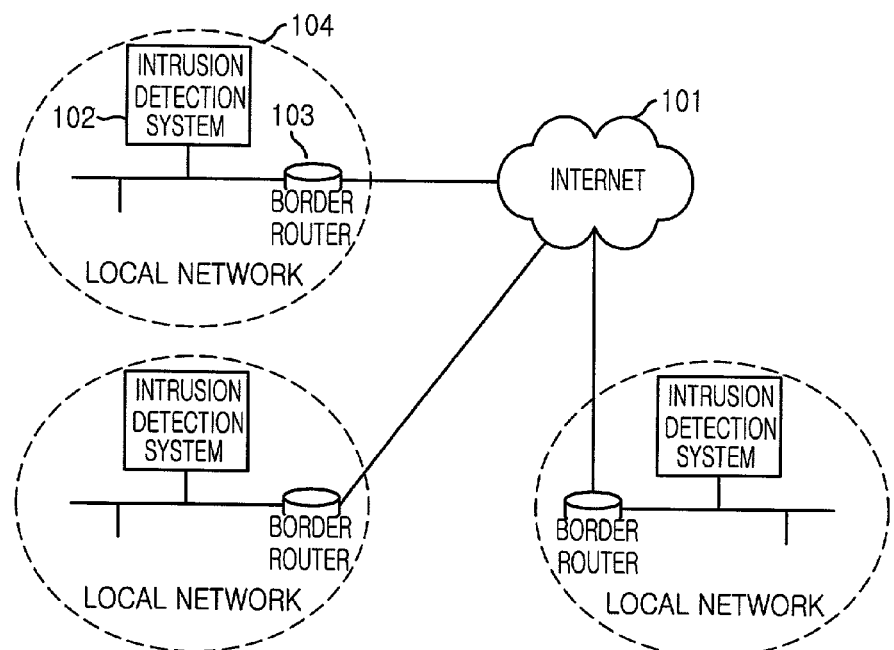
FIG. 1 is an illustrative pictorial representation of a security system in accordance with a preferred embodiment of the present invention.

With reference to FIG. 1, there is an illustrative pictorial representation of a security system in accordance with a preferred embodiment of the present invention.

As shown in FIG. 1, a security system for each local network 104 includes an intrusion detection system (IDS) 102 for creating and recognizing an active packet, and a local network border router 103 consisted of an active node.

The intrusion detection system 102 on each of the local networks 104 analyzes a packet to detect an intrusion thereon, creates an active packet by adding information associated with the intrusion to the packet, and transmits it to an address that transmitted an intruder packet.

The border router 103 in each local network 104, which is composed of the active node, tracks the intrusion based on the active packet provided thereto from the intrusion detection system 102 for all network routes through which the intruder have passed, and filters the packet associated with the intruder for the isolation thereof.

Figure 2:
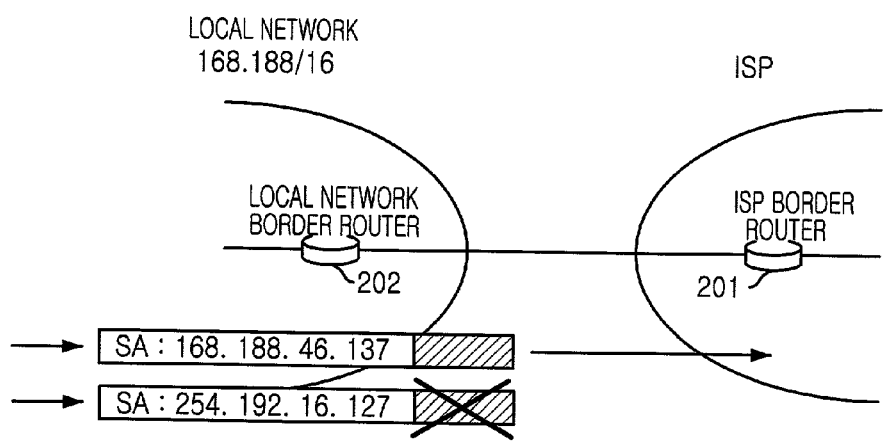
FIG. 2 is a pictorial representation illustrating the packet filtering of the local network border router in accordance with a preferred embodiment of the present invention.

With reference to FIG. 2, there is a pictorial representation illustrating the packet filtering of the local network border router 103 in accordance with a preferred embodiment of the present invention.

As shown in FIG. 2, since all intrusions starts from the local network, each local network border router 202 does not transmit a packet distinct from its own network address through the filtering function, it is possible to prevent an Internet protocol (IP) address spoofing, and a system which detected the intrusion has the ability to recognize whether the intrusion has been originated from any local network.

Once the intrusion detection system detects the intrusion, the intrusion information is transmitted to a border router in a local network to which a user to be attacked belongs and a border router in a local network to which the intruder belongs. If each local network border router is an active node and the intrusion detection system has the ability to create an active packet, both of the local network border routers have the ability to perform a packet filtering function to thereby defense against the intrusion from the overall network level. The reason is in that since the intrusion detection system adds information of an intruder into the active packet, and transmits the same to an address that transmitted the intruder packet, when it passes through a route through that the intruder passed, the local network border router has the ability to recognize the active packet created from the intrusion detection system. Wherein the intruder information includes an IP address, port number and the like.

Figure 3:
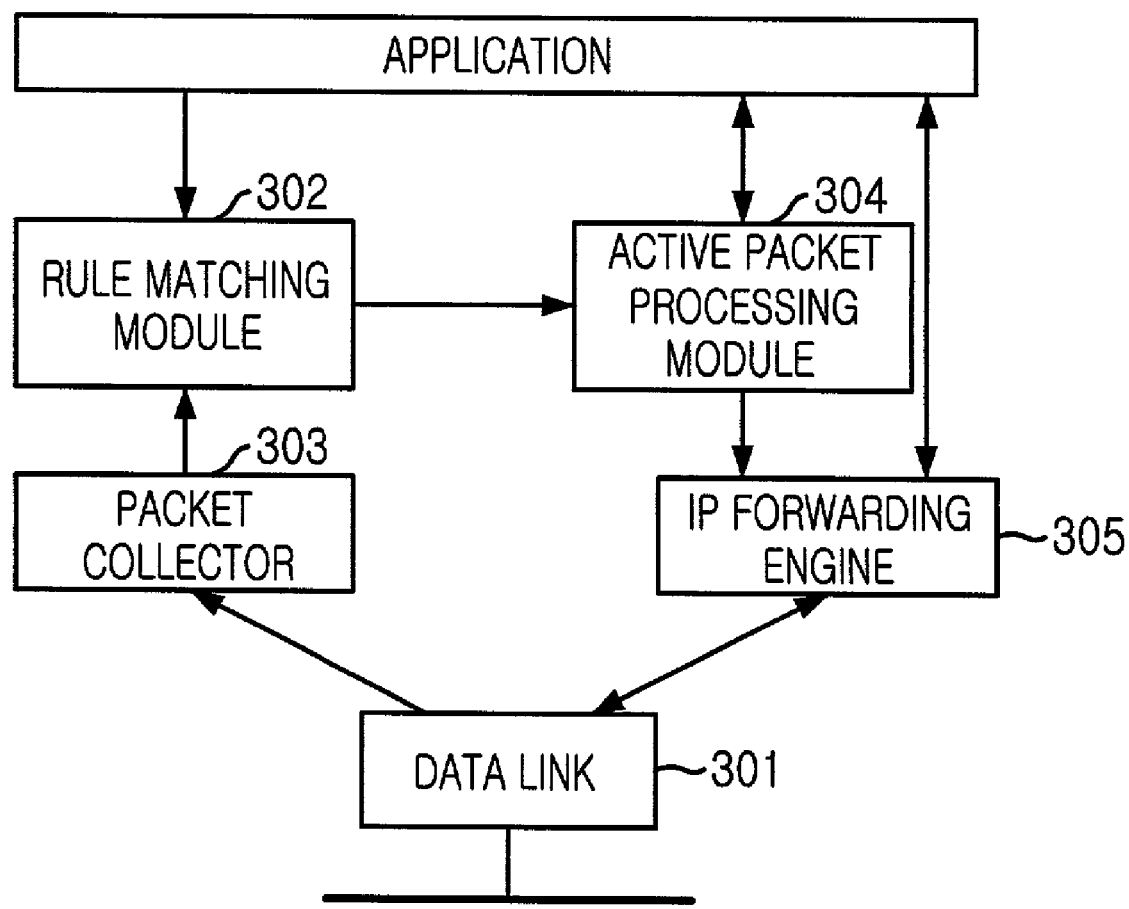
FIG. 3 is a detailed block diagram of the intrusion detection system shown in FIG. 1 in accordance with the present invention.

With reference to FIG. 3, there is a detailed block diagram of the intrusion detection system shown in FIG. 1 in accordance with the present invention.

As shown in FIG. 3, the intrusion detection system of the present invention further includes an active packet processing module 304 relative to the conventional intrusion detection system.

A description will be made as to the structure of the intrusion detection system of the present invention.

A packet collector 303 collects packets, which passes through a data link 301 and forwards it to a rule matching module 302.

The rule matching module 302 receives and analyzes the packet from the packet collector 303. If the received packet is concerned to an intrusion symptom, the rule matching module 302 transmits intrusion symptom information to the active packet processing module 304, and if it is an active packet, the rule matching module 302 transmits the active packet to the active packet processing module 304.

The active packet processing module 304 determines whether the information provided thereto from the rule matching module 302 is one associated with the intrusion or the active packet. For the intrusion information, the active packet processing module 304 creates an active packet associated with the intrusion information to another local network through an IP forwarding engine 305. For the active packet, the active packet processing module 304 analyzes whether the active packet is one associated with the intrusion information. If the analyzed result represents that the intrusion is made through an authenticated server, the active packet processing module 304 transmits a mobile agent to the server to thereby retrieve information for an external intruder.

Figure 4:
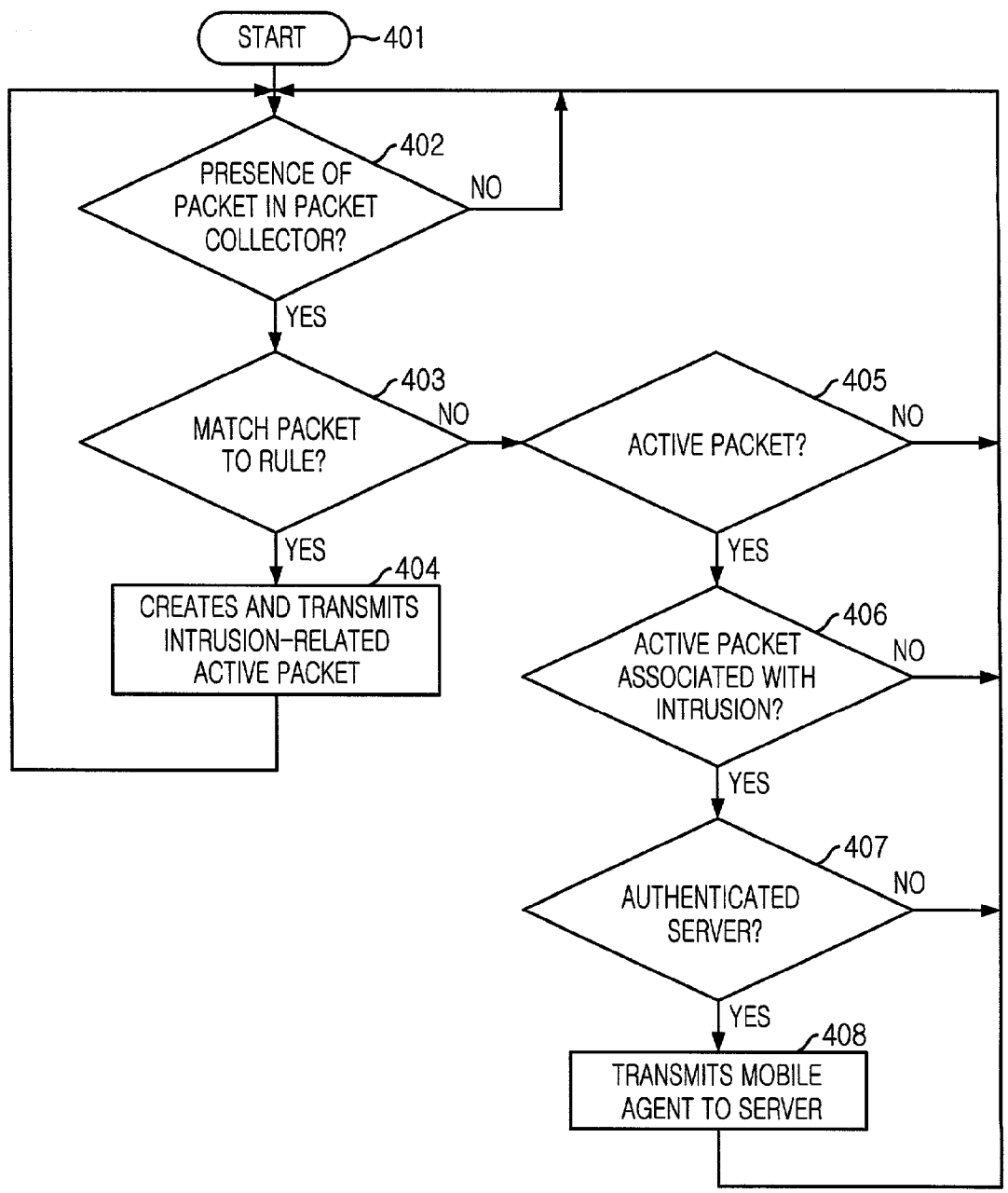
FIG. 4 is a flow chart which will be used to describe the operation of the intrusion detection system of the present invention.

FIG. 4 is a flow chart, which will be used to describe the operation of the intrusion detection system of the present invention.

With reference to FIG. 4, a decision is made at step 402 to determine whether the presence or absence of a packet in a packet collector. Upon the presence of the packet in the packet collector, at step 403 the control process analyzes whether the packet is concerned with an intrusion symptom, i.e., the packet is matched to a rule, thereby checking whether an intrusion is made. If the checked result is determined as the intrusion, at step 404 the control process creates an active packet associated with the intrusion using the active packet processing module 304 shown in FIG. 3, and transmits it to an address that transmitted the intruder packet. At step 405, the control process determines whether the checked result is the active packet, and if so, at step 406 it determines whether the active packet is one associated with the intrusion information. At step 406 if the active packet is the one associated with the intrusion information, at step 407 the control process determines whether the intrusion is made through an authenticated server, and if so, it transmits a mobile agent to the server and retrieves information for an external intruder.

Figure 5:
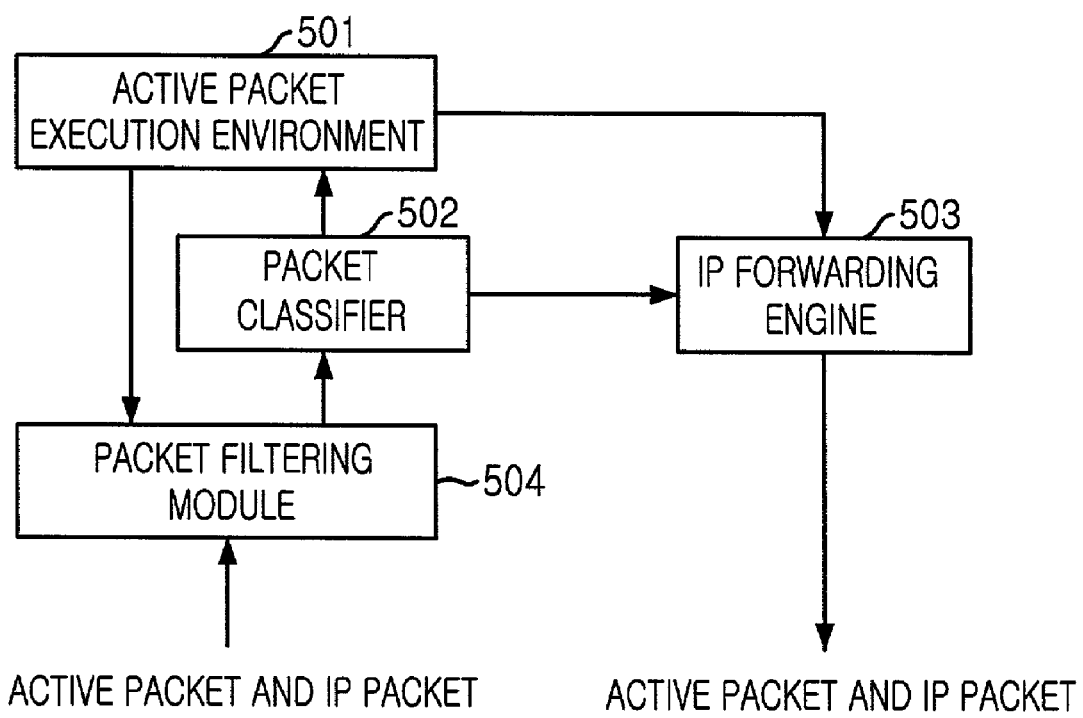
FIG. 5 is a detailed block diagram of the local network border router shown in FIG. 1 in accordance with the present invention.

FIG. 5 is a detailed block diagram of the local network border router shown in FIG. 1 in accordance with the present invention.

As shown in FIG. 5, in contrast to the conventional local network border router, the local network border router of the present invention includes an active packet execution environment 501 for executing an active packet and a packet filtering module 504 for performing a packet filtering.

A description will be made as to the structure of the local network border router of the present invention.

The packet filtering module 504 determines whether it transmits or rejects an active packet or IP packet provided thereto from the local network border router. If the packet is one to be determined, the packet filtering module 504 transmits the packet to a packet classifier 502.

The packet classifier 502 classifies whether the packet provided thereto from the packet filtering module 504 is the active packet or the IP packet. For the IP packet, the packet classifier 502 forwards the IP packet through an IP forwarding engine 503. For the active packet, the packet classifier 502 transmits the active packet to the active packet execution environment 501 wherein the packet is executed.

When the packet provided thereto from the packet classifier 502 is one associated with intrusion information, the active packet execution environment 501 adds packet-related information to be filtered to the packet filtering module 504 and then forwards the packet through the IP forwarding engine 503.

Figure 6:
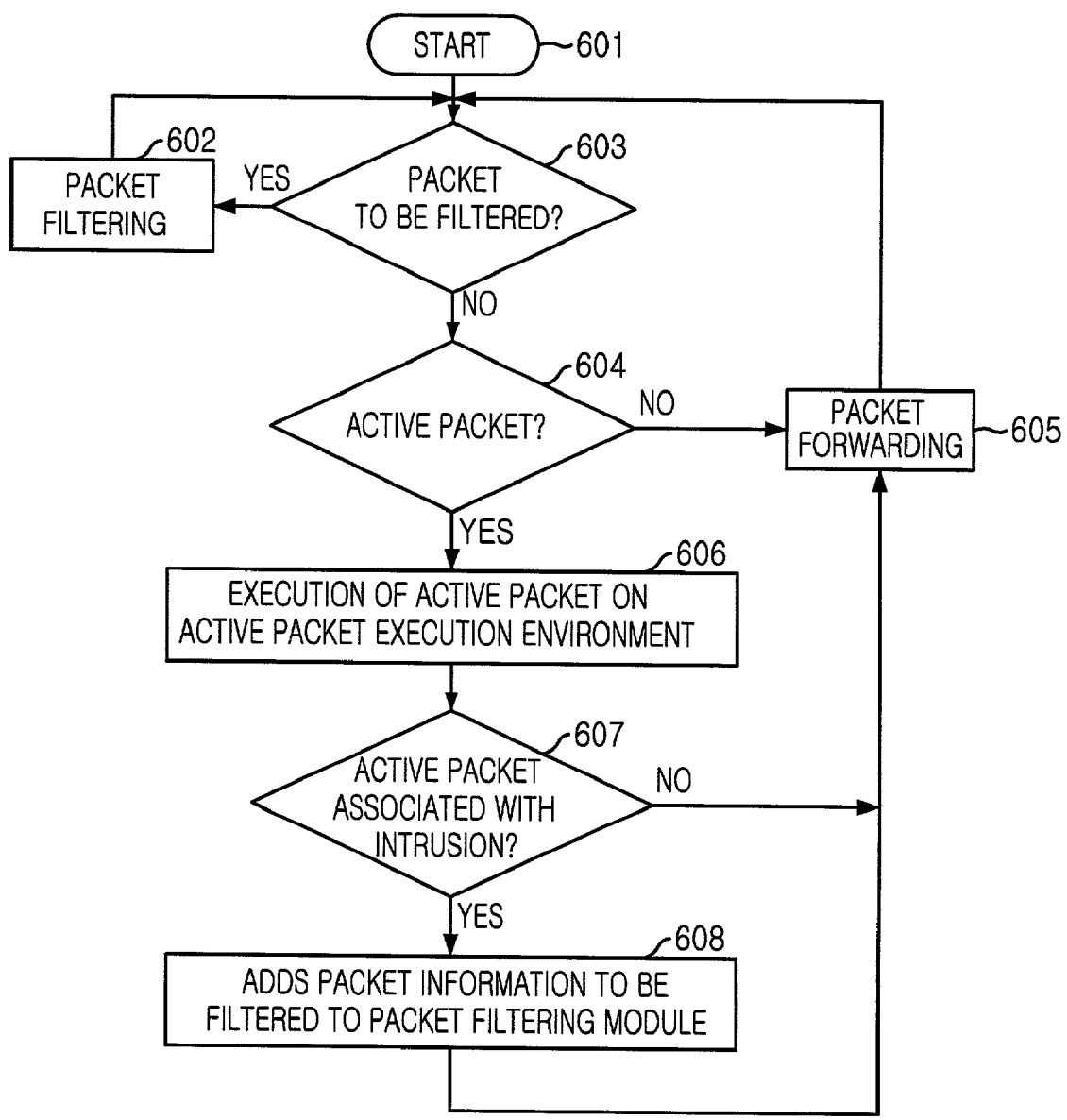
FIG. 6 is a flow chart, which will be used to describe the operation of the local network border router of the present invention.

FIG. 6 is a flow chart, which will be used to describe the operation of the local network border router of the present invention.

With reference to FIG. 6, at step 603 the control process determines whether a packet inputted to the local network border router should be filtered, i.e., the packet should be transmitted or rejected. If the packet is one to be rejected, at step 602 the control process performs the packet filtering. On the one side, at step 604 the control process determines whether the packet to be transmitted is an IP packet or active packet. For the active packet, at step 606 the control process executes the active packet at the active packet execution environment. At step 607, the control process determines whether the active packet is one associated with intrusion information, and if so, adds the intrusion information of the packet to the packet filtering module at step 608, and forwards the packet through the IP forwarding engine at step 605. On the one side, if the packet to be transmitted is the IP packet, at step 605 the control process forwards the packet through the IP forwarding engine.

FIGS. 7 to 10 are pictorial representations showing the case a security system for all networks is not established, the case an intrusion is made at a local network inside the security system, the case the intrusion is made at a local network outside the security system, and the case the intrusion is made via another host, respectively. As an example of the present invention, assuming that the security system is performed only within ISP (Internet Service Provider). It is obvious that a plurality of ISPs may be used as the security system.

Figure 7:
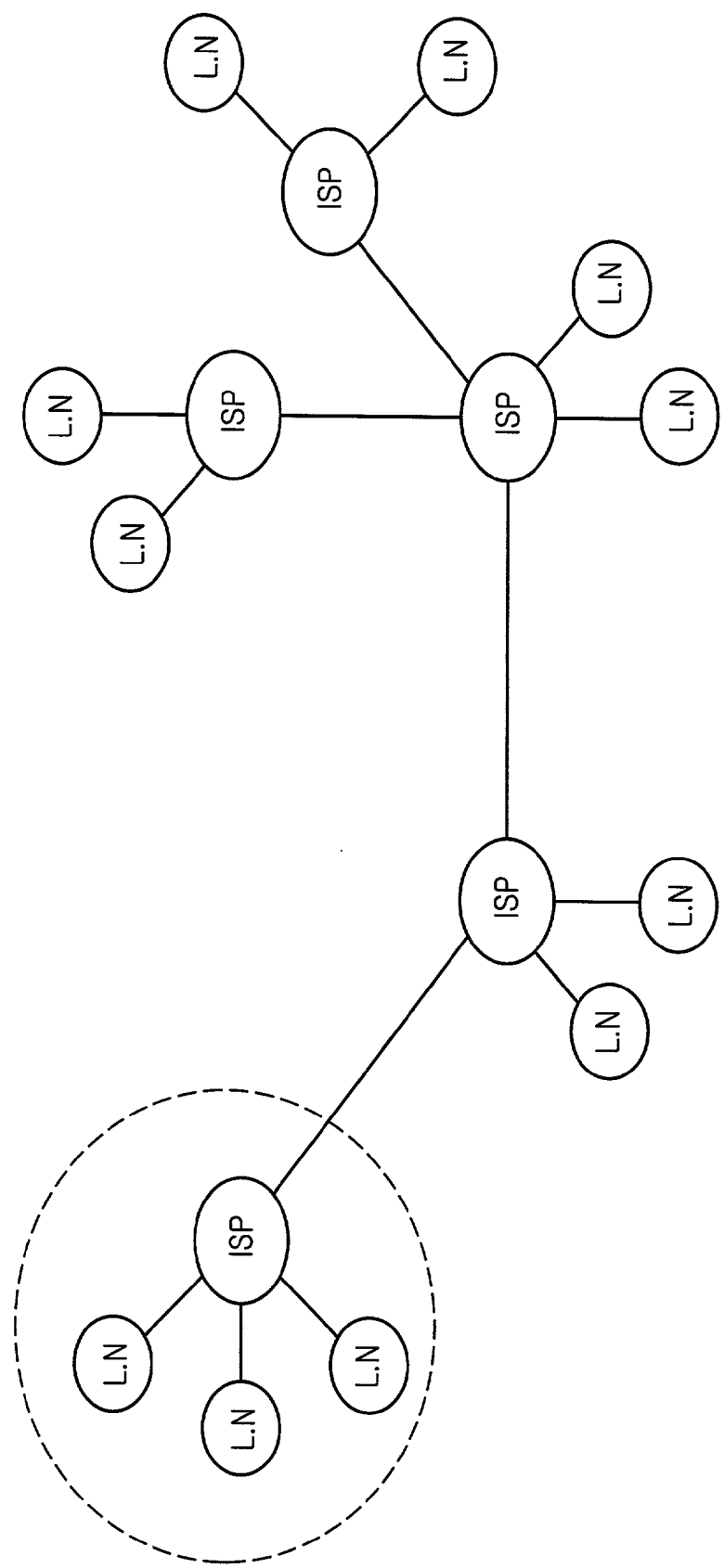
FIG. 7 is a pictorial representation of a configuration of Internet network to which the present invention is applied.
Figure 8:
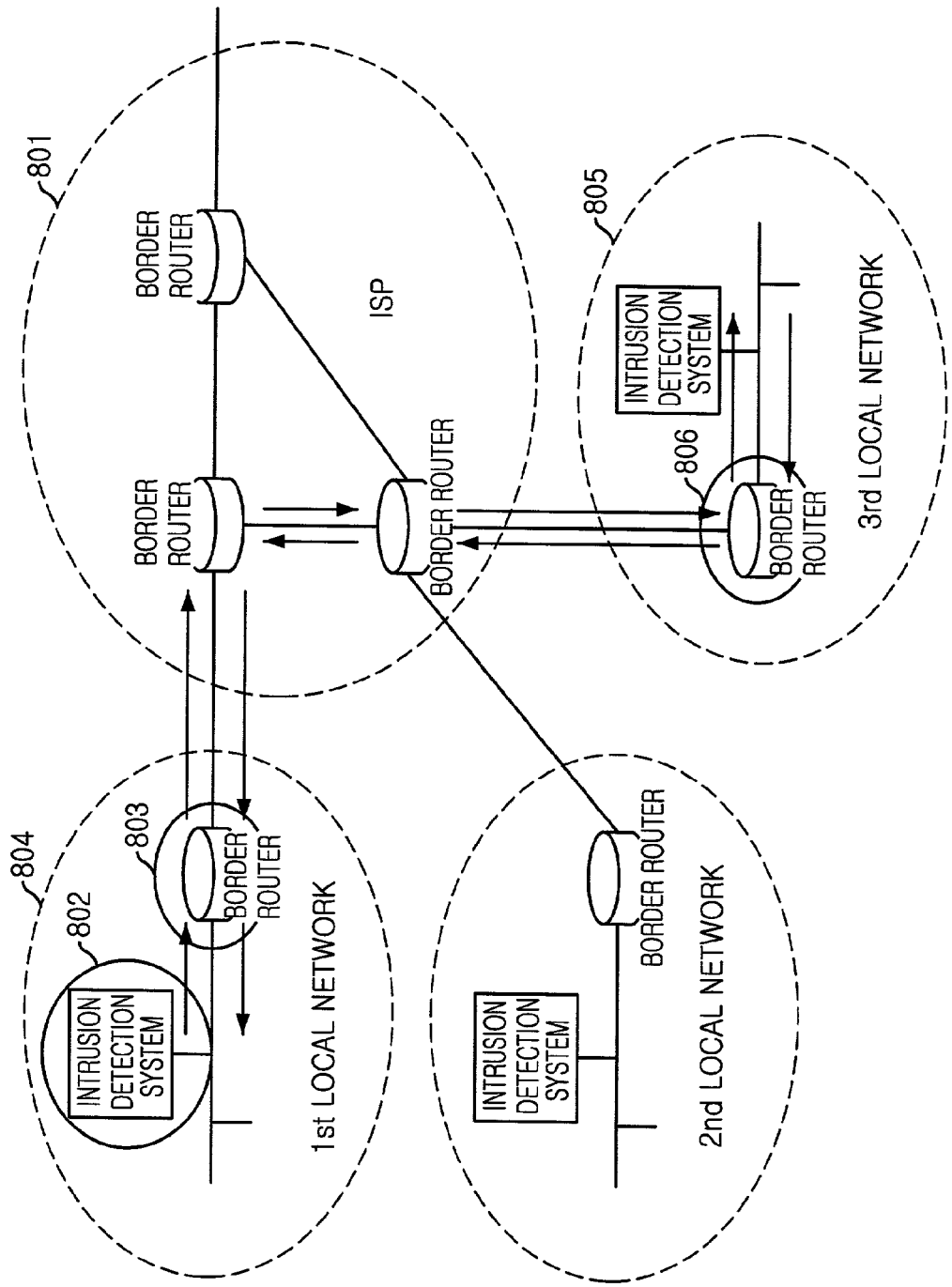
FIG. 8 is a pictorial representation illustrating a procedure of defending against an intrusion, which is made inside the security system in accordance with the present invention.
Figure 9:
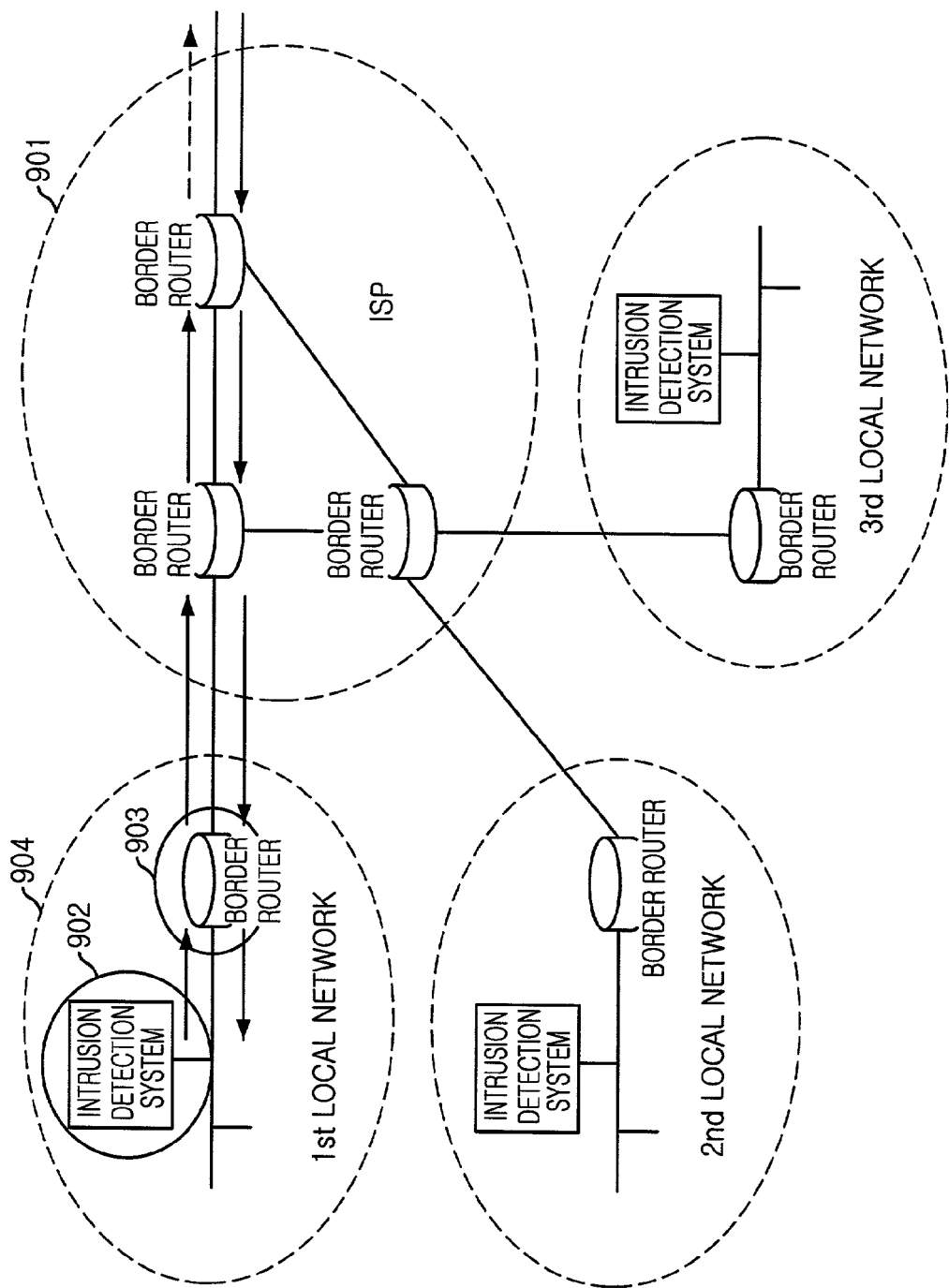
FIG. 9 is a pictorial representation illustrating a procedure of defending against an intrusion which is made outside the security system in accordance with the present invention.
Figure 10:
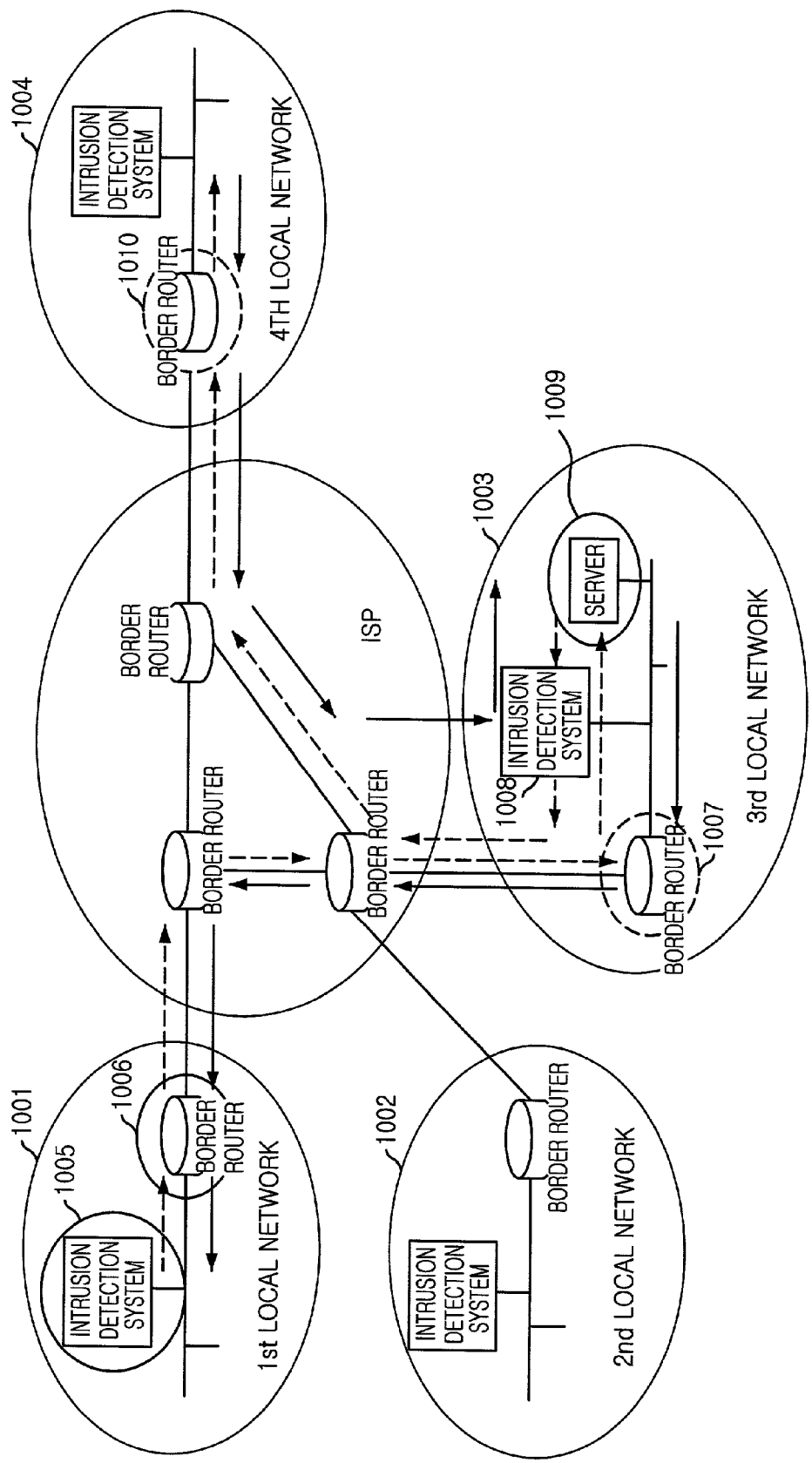
FIG. 10 is a pictorial representation illustrating a procedure of defending against an intrusion to be attacked to a security system via another host (server) in accordance with another preferred embodiment of the present invention.

FIG. 7 is a pictorial representation of a configuration of Internet network to which the present invention is applied, which may be commonly applied to FIGS. 8 to 10. In FIG. 7, a portion indicated by a dot phantom line corresponds to the security system proposed by the present invention.

FIG. 8 is a pictorial representation illustrating a procedure of defending against an intrusion, which is made inside the security system in accordance with the present invention.

As shown in FIG. 8, when an intruder located in a third local network 805 attempts to intrude into a server of a first local network 804, an intrusion detection system 802 of the first local network 804 detects the intrusion attempt, adds information of the intruder into an active packet and transmits it to the intruder. Since a border router 806 in all local networks has a filtering function, the intruder fails to perform an IP spoofing, thereby allowing the active packet to be transmitted up to the local network to which the intruder belongs. The border router 803 of the first local network 804 is an active node so that it has the ability to recognize and perform the active packet. Thus, the packet of the intruder transmitted from the third local network 805 is blocked by the filtering at the border router 803 and sequentially transmitted through the ISP 801. Since routers of all ISPs 801 fail to recognize the active packet, it performs only the forwarding function. Finally, if the active packet reaches the border router 806 of the third local network 805 to which the intruder belongs, the border router 806 performs the filtering to prevent the packet of the intruder from being further drained externally.

FIG. 9 is a pictorial representation illustrating a procedure of defending against an intrusion which is made outside the security system in accordance with the present invention.

As shown in FIG. 9, when an intruder attempts to intrude into a server of a first local network 904 from outside the security system, an intrusion detection system 902 of the first local network 904 detects the intrusion attempt, adds information of the intruder into an active packet and transmits it to the intruder. Since the border router 903 of the first local network 904 is an active node so that it has the ability to recognize the active packet. Thus, the packet of the intruder transmitted from outside the security system is blocked by the filtering at the border router 903 and sequentially transmitted through the ISP 901. Since routers of all ISPs 901 fail to recognize the active packet, it performs only the forwarding function. As a result, if the active packet is outputted exterior to the security system, it is difficult to defenses further against the intrusion through the tracking of the packet. Accordingly, only the local network that detected the intrusion may accomplish the defense against the intrusion.

FIG. 10 is a pictorial representation illustrating a procedure of defending against an intrusion to be attacked to a security system via another host (server) in accordance with another preferred embodiment of the present invention.

As shown in FIG. 10, a portion indicated by a bold line represents the case that an intruder which belongs to a fourth local network 1004 attacked against a server in a first local network 1001 via a server 1009 in a third local network 1003. A portion indicated by a dot phantom line represents a defense path against the intrusion and a detailed description therefor will be made hereinafter.

An intrusion detection system 1005 located at the first local network 1001 detects the intrusion, adds information of the intruder into an active packet and transmits it to the server 1009 of the third local network 1003. In this case, a border router 1006 in the first local network 1001 and a border router 1007 in the third local network 1003 filter a packet associated with the intrusion which is transmitted thereto from the third local network 1003. At this moment, the intrusion detection system 1008 located at the third local network 1003 analyzes the active packet transmitted thereto from the first local network 1001, recognizes that the intrusion is made from the server 1009 itself, transmits a mobile agent to the server 1009, and retrieves information for one which is transmitted to the first local network 1001 among packets provided externally. Through the use of the information, the intrusion detection system 1008 in the third local network 1003 recognizes that the intrusion has been originated from the fourth local network 1004. Finally, the local network border router 1008 in the third local network 1003 adds the information of the intruder into the active packet and transmits it to an address of the intruder in the fourth local network 1004. In this procedure, the border router 1007 in the third local network 1003 and a border router 1010 in the fourth local network 1004 filter a packet associated with the intrusion which is transmitted thereto from the fourth local network 1004.

The inventive method as mentioned above may be implemented with a program which may be stored in a computer-readable medium such as a compact-disc read only memory (CD-ROM), a random access memory (RAM), ROM, fixed or flexible disk media, hard disc, optical magnetic disc, tape, or any other storage retrieval means, or any combination of these storage retrieval means.

As demonstrated above, the present invention changes only a border router in a local network and an intrusion detection system, without changing the conventional ISP, detects, tracks and isolates the intrusion from the viewpoint of the overall network, to thereby minimize a modification requirement of the conventional schemes, which, in turn, defenses efficiently against the intrusion to be occurred on a network to which an intruder belongs.

Although the preferred embodiments of the invention have been disclosed for illustrative purposes, those skilled in the art will appreciate that various modifications, additions and substitutions are possible, without departing from the scope and spirit of the invention as disclosed in the accompanying claims.

What is claimed is:

1. A security system on a network, comprising:
    intrusion detecting means for detecting an intrusion through an analysis of a packet, adding intrusion information associated with the intrusion into the packet, creating an active packet and transmitting the active packet to an address of an intruder which transmitted the packet; and
    routing means for tracking the intrusion, for all routes through which the intruder passed, based on the active packet transmitted thereto from the intrusion detecting means, and filtering the packet associated with the intruder, thereby isolating the intruder,
    wherein the routing means includes active nodes on a local networks of a user to be attacked and the intruder;
    wherein the intrusion detecting means includes:
        collection means for collecting packets which pass therethrough;
        analysis means for receiving the packet from the collecting means and determining whether the packet is one associated with intrusion or an active packet; and
        processing means for processing the intrusion information or the active packet, which is received from the analysis means;
    wherein the processing means, if the data received from the analysis means is one associated with the intrusion information, creates an active packet associated with the intrusion information and transmits it to another local network, and if the data received from the analysis means is the active packet, analyzes whether the active packet is concerned with the intrusion information, and
    wherein if the intrusion is made via an authenticated server, the processing means creates a mobile agent, transmits the same to the server and retrieves information for the intruder.

2. The system as recited in claim 1, wherein the intrusion detecting means includes means for recognizing a local network from which the intrusion is originated, during the detection of the intrusion; and means for notifying the intrusion of a filtering means in a local network to which the user to be attacked belongs and that in a local network to which the intruder belongs.

3. The system as recited in claims 1, wherein the routing means includes:
    filtering means for determining whether the packet is transmitted or not;
    classifying means for determining whether the packet from the filtering means is an active packet or an Internet protocol (IP) packet, if the packet is the IP packet, forwarding the packet, and if the packet is the active packet, transmitting the packet to be executed at an active packet execution environment; and
    means, if the packet classified by the classifying means is one associated with the intrusion information, for adding the packet information to be filtered to the filtering means and forwarding the packet through an IP forwarding engine.

4. A method for use in a security system, which comprising the steps of:
    a) detecting an intrusion through an analysis of a packet, adding intrusion information associated with the intrusion into the packet, creating an active packet and transmitting the active packet to an address of an intruder which transmitted the packet; and
    b) tracking the intrusion, for all routes through which the intruder passed, by sharing intrusion detection information detected at local network border routers each of which includes an active node, to thereby defense against the intrusion on a network to which the intruder belongs;
    wherein the step a) includes the steps of:
        a1) determining whether there is a packet or not;
        a2) determining, if there is the packet, whether the packet is one associated with the intrusion information, and if so, creating an active packet associated with the intrusion information and transmitting it to another local network;
        a3) analyzing, if the packet is the active packet, whether the active packet is concerned with the intrusion information; and
        a4) determining whether the intrusion is made via an authenticated server, and if so, creating a mobile agent, transmitting the mobile agent to the server and retrieving information for the intruder.

5. The method as recited in claim 4, wherein the step b) includes the steps of:
    b1) classifying, if the packet inputted to the local network border router is one to be transmitted by filtering, whether the packet is an active packet or an Internet protocol (IP) packet;
    b2) if the packet is the IP packet, forwarding the packet; and
    b3) if the packet is the active packet, determining, whether the packet is one associated with the intrusion information, and if so, storing the intrusion information and forwarding the packet.

6. A computer-readable recording medium storing instructions for executing a method for use in a security system including a processor, the method comprising the steps of:
    a) detecting an intrusion through an analysis of a packet, adding intrusion information associated with the intrusion into the packet, creating an active packet and transmitting the active packet to an address of an intruder which transmitted the packet; and b) tracking the intrusion, for all routes through which the intruder passed, by sharing intrusion detection information detected at local network border routers each of which includes an active node, to thereby defense against the intrusion on a network to which the intruder belongs;

wherein the step a) includes the steps of:
- a1) determining whether there is a packet or not;
- a2) determining, if there is the packet, whether the packet is one associated with the intrusion information, and if so, creating an active packet associated with the intrusion information and transmitting it to another local network;
- a3) analyzing, if the packet is the active packet, whether the active packet is concerned with the intrusion information; and
- a4) determining whether the intrusion is made via an authenticated server, and if so, creating a mobile agent, transmitting the mobile agent to the server and retrieving information for the intruder.

7. The computer-readable recording medium as recited in claim 6 wherein the step b) includes the steps of:
- b1) classifying, if the packet inputted to the local network border router is one to be transmitted by filtering, whether the packet is an active packet or an Internet protocol (IP) packet;
- b2) if the packet is the IP packet, forwarding the packet; and
- b3) if the packet is the active packet, determining, whether the packet is one associated with the intrusion information, and if so, storing the intrusion information and forwarding the packet.

* * * * *